Jan. 9, 1962  A. E. POWELL  3,016,498
TRANSMISSION SYSTEM
Filed Oct. 13, 1958

ALBERT E. POWELL
INVENTOR.

BY John P. Chandler

HIS ATTORNEY.

UNITED STATES PATENT OFFICE 3,016,498
Patented Jan. 9, 1962

3,016,498
TRANSMISSION SYSTEM
Albert E. Powell, Chatham, N.J., assignor, by mesne assignments, to Sealectro Corporation, Mamaroneck, N.Y., a corporation of New York
Filed Oct. 13, 1958, Ser. No. 766,969
5 Claims. (Cl. 333—30)

This invention relates to a transmission system which receives an electrical pulse at a transmission coil and produces a similar electrical pulse at a receiving coil. The transmission system provides a definite time interval delay between the application of the pulse to one coil and its reception at a second coil. The invention has particular reference to the details of the transmission system components which result in increased efficiency of transmission and ease of operation.

Magnetostrictive delay lines have been in use for some time in the field of radar and other communications systems including data storage systems. In each of these systems a magnetostrictive line generally composed of nickel wire or strip is surrounded by a transmission coil and a receiving coil, these coils being spaced apart to provide a predetermined time delay. The transmission coil receives an electrical pulse from an associated electrical circuit and this pulse is transformed into a mechanical disturbance in the line which travels at the speed of sound in the material from the transmission coil to the receiving coil at which point it is transformed into an electrical pulse in the receiving core windings. One of the disadvantages of prior art systems is the inefficiency of transfer from the electrical pulse supplied to the transmission coil to the pulse produced by the receiving coil. The designed features hereinafter described produced a marked increase in efficiency of transfer and at the same time produce sharp well defined pulses in the line and at the receiving coil terminals. The increased efficiency is due to the reduction of eddy currents in the line and the reduction of mechanical pulse dispersion along the line. Additional increase of efficency is due to the magnetic efficiency of the coils surrounding the line, these coils having a low reluctance magnetic path and an efficient means for applying a magnetic bias to each coil.

One of the objects of this invention is to provide an improved transmission system which avoids one or more of the disadvantages and limitations of prior art arrangements.

Another object of the invention is to provide a more efficient means for transmitting an electrical pulse to a megnetostrictive line.

Another object of the invention is to permit the transfer of short well defined pulses into the line having a short time duration.

Another object of the invention is to provide a calibration means so that the time delay in seconds may be read on a scale.

Another object of the invention is to increase the magnetic efficiency of the transmitting and receiving coils.

Another object of the invention is to reduce the reluctance of the magnetic paths of the transmitting and receiving coils.

Another object of the invention is to provide a coil assembly which is permanent and convenient to operate.

Another object of the invention is to reduce the eddy current loss in the magnetostrictive line and at the same timfle reduce the dispersion of the mechanical pulse as it travels along the line.

One feature of the invention comprises a megnetostrictive line including a bundle of fine wires maintained in tension by a resilient means, the diameter of said wires being less than five times the wave length of the pulse in the line.

Another feature of the invention comprises a transmitting coil surrounding the line and having a ferromagnetic shield substantially enclosing the coil. The shield is made in the form of a double cup with components spaced apart to form an air gap between the rims. A permanent magnet is positioned adjoining the cups so as to apply a magnetic bias between the cup structures.

For a better understanding of the present invention, together with other and further objects thereof, reference is made to the following description taken in connection with the accompanying drawings.

Figure 1:
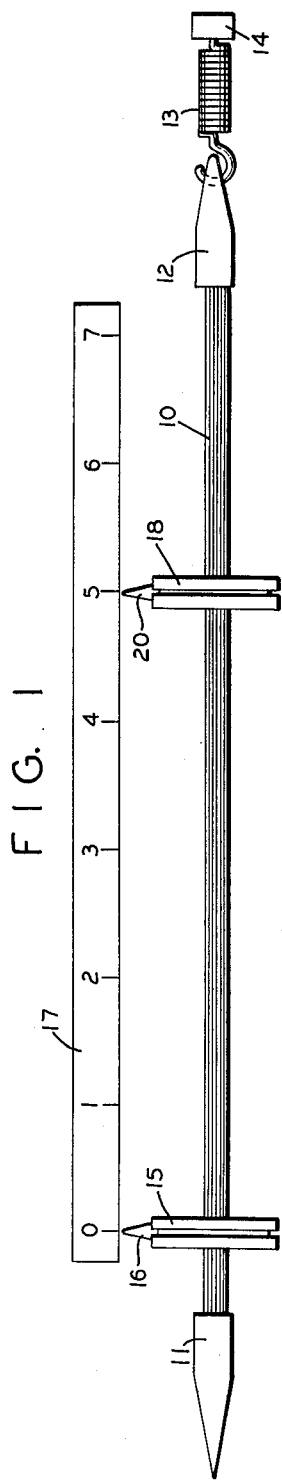
FIG. 1 is a side view of the complete transmission system showing the line, two coils, and a calibration scale.

Referring now to FIG. 1, the transmission system includes a magnetostrictive line 10 formed of a plurality of fine wires held together in a generally cylindrical form and terminated at each end by a reflection absorbing terminal block 11, 12. These terminal blocks are old in the art and are generally made of lead or some other material which is well adapted to absorb mission line. One block 11 is held by securing means (not shown) while the other block 12 is stressed by a spring 13 mounted between the termnial block 12 and an anchoring means 14. The resilient spring 13 maintains the wires 10 in tension, straightening any slight bends that might otherwise exist in individual wires and helping to maintain the grain alignment of the molecular structure of the wire material. A transmitting coil 15 is mounted near one end of the line, the coil terminals arranged for connection to an electrical source of current pulses. The transmitting coil is provided with an indicating means 16 which cooperates with a calibrated scale 17 having data divisions thereon for indicating the fraction of a second delay time between the transmitting and receiving coils.

A receiving coil 18 is also mounted surrounding the line 10 for receiving a mechanical pulse traveling along the line and for transforming that pulse into a current pulse for delivery to a utilization circuit (not shown). The receiving coil is also provided with an indicating means 20 which cooperates with the calibration scale 17 to show the time delay produced by the system.

Figure 2:
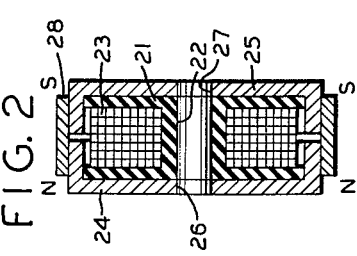
FIG. 2 is a cross sectional view of one form of coil showing the cup shields and an annular permanent magnet.

The transmission and receiving coils are generally identical although such construction is not necessary. FIG. 2 shows a cross sectional view of one form of coil which may be used for either a transmitting coil or a receiving coil. The coil comprises a coil form 21 which may be of any suitable insulated material such as Bakelite or hard rubber. The coil form 21 is made with a hole 22 for enclosing the magnetostrictive line 10. A coil of wire 23 is wound on the form 21 and its terminals are connected to a transmitting or receiving circuit. Surrounding most of the coil form are two shield members 24 and 25 which can be made of high permeability iron but are generally constructed of ferrite material having a high permeability but low conductivity to eliminate loss by eddy currents. The cup portions 24 and 25 are provided with axially aligned holes 26 and 27 to accommodate the line 10. On the outside of the shield periphery an annular permanent magnet 28 is mounted. This magnet joins the two cup members 24 and 25 and is magnetized so that one edge of the annular band contains a north pole and the other end contains a south pole. The permanent magnet closes the air gap and shields the coil 23 from outside dust and air. The magnet also produces a magnetic bias and thereby provides a constant magnetic flux which traverses that portion of line 10 which is within hole 22.

Figure 5:
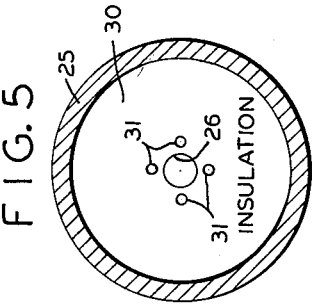
FIG. 5 is a cross sectional view of the coil shown in FIG. 4 taken along line 5—5 of that figure.
Figure 4:
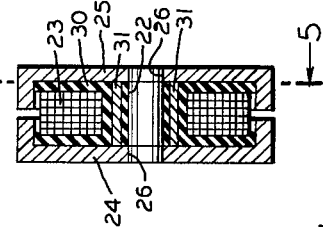
FIG. 4 is a cross sectional view of an alternate form of coil wherein the permanent magnet bias is produced by one or more rods supported by the coil structure adjacent to the opening for the line.

The coil form shown in FIGS. 4 and 5 includes a winding 23 as before, wound on a coil form 30 and substantially enclosed by shield members 24 and 25. A hole 22 is provided in the coil form as before and similar aligned holes 26 and 27 are formed in the shield portions to accommodate the line. The magnetic bias for this coil is provided for by one or more cylindrically shaped bar magnets 31. For certain types of transmission line only one bar may be necessary but it is contemplated that many more magnets may be used as shown in FIG. 5. The uncovered air gap between shield members 24 and 25 may be covered by a strip of plastic for coil protection. It is obvious that the magnetic path for the permanent magnet flux is much shorter in the form shown in FIG. 4 than in the new form shown in FIG. 2. However, the coil form shown in FIG. 4 must of necessity be somewhat larger at its axial position than the coil shown in FIG. 2.

Figure 3:
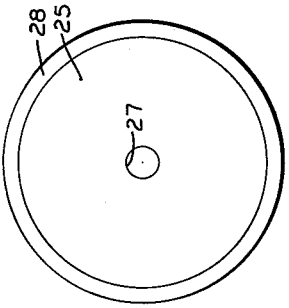
FIG. 3 is a side view of the coil shown in FIG. 2.
Figure 7:
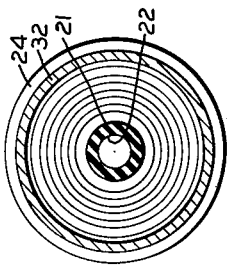
FIG. 7 is a cross sectional view of the coil shown in FIG. 6 taken along line 7—7 of that figure.
Figure 6:
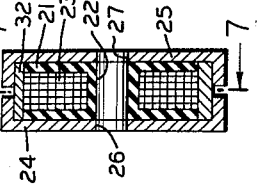
FIG. 6 is a cross sectional view of another alternate form of coil. This form showing an annular permanent magnet surrounding the coil but inside the cup shields.

The coil shown in FIGS. 6 and 7 is similar to that shown in FIGS. 2 and 3 except that an annular permanent magnet 32 is mounted on the inside of the shield portions and encloses the coil 23 and the coil form 21. The characteristics of this coil are substantially the same as the form shown in FIGS. 2 and 3.

The drawings of the coil and coil forms are greatly exaggerated in order to show their details of construction. In actual practice the width of the entire coil assembly including the coil, coil form, and shield, is less than one-tenth of an inch. This restriction in dimensions is achieved in order to protect a sharp narrow pulse into the line.

While the above description was limited to the use of nickel wires, under tension, it is to be understood that any type of material can be used having magnetostrictive qualities and capable of transmitting a mechanical pulse along the line. Other modifications may be made, the only limitations to the present invention are to be determined by the scope of the appended claims.

I claim:

1. A transmission system for transmitting a pulse along a magnetostrictive line comprising a transmitting coil surrounding said magnetostrictive line, a receiving coil also surrounding said line and spaced from the transmitting coil, said line comprising a plurality of wires parallel to each other in a compact bundle, the diameter of said wires being less than five times the wave length of the pulse in the line, resilient means for maintaining said wires in tension, said transmitting and receiving coils each surrounded by a ferromagnetic shield for reducing the reluctance of the magnetic flux caused by a current pulse in the coil, said shields having the form of a double cup with an air gap between the rims of said cups, and an annular permanent magnet positioned so as to apply a magnetic bias between said cups.

2. A transmission system for transmitting a pulse along a magnetostrictive line from a transmitting coil to a receiving coil comprising a transmitting coil surrounding the line, a receiving coil also surrounding the line and spaced apart from the transmitting coil, said line comprising a plurality of wires parallel to each other in a compact bundle, the diameter of each of said wires being less than five times the wave length of the pulse in the line material, resilient means applied to the ends of said line for maintaining said wires in tension, said transmitting and receiving coils each surrounded by a ferromagnetic shield for reducing the reluctance of the magnetic flux caused by a current pulse in the coil, each of said shields having the form of a double cup with an annular air gap between the rims of said cups, an annular permanent magnet with its poles adjoining each of said cups so as to apply a magnetic bias between said cups and to cause magnetic flux to traverse the portion of the line surrounded by each of the coils.

3. A transmission system as set forth in claim 2 wherein said annular permanent magnet is a band surrounding the shields and in contact therewith.

4. A transmission system as set forth in claim 2 wherein said annular permanent magnet is a band surrounding the coil on the inside of the shield and in contact with said two cup portions.

5. A transmission coil assembly for the transfer of energy between an electrical pulse in the coil windings and a mechanical pulse in a magnetostrictive line comprising a coil of wire surrounding the line, a ferromagnetic shield in two parts substantially surrounding said coil, each of said parts made in the form of a cup with a central hole for positioning the line, said cups spaced apart at their rims to form an air gap, and an annular permanent magnet with its poles adjoining said cups so as to apply a magnetic bias between said cups and to cause magnetic flux to traverse the portion of the line surrounded by the coil.

References Cited in the file of this patent

UNITED STATES PATENTS

| | | |
|---|---|---|
| 2,031,789 | Pierce | Feb. 25, 1936 |
| 2,063,948 | Pierce et al. | Dec. 15, 1936 |
| 2,275,675 | Draper et al. | Mar. 10, 1942 |
| 2,433,898 | Gilman | Jan. 6, 1948 |
| 2,455,740 | Curtis | Dec. 7, 1948 |
| 2,484,960 | Rich | Oct. 18, 1949 |
| 2,584,600 | MacKimmie | Feb. 5, 1952 |
| 2,596,226 | Eldridge | May 13, 1952 |
| 2,600,870 | Hathaway et al. | June 17, 1952 |
| 2,709,243 | Babcock | May 24, 1955 |
| 2,815,490 | De Faymoreau | Dec. 3, 1957 |
| 2,846,666 | Epstein et al. | Aug. 5, 1958 |

FOREIGN PATENTS

| | | |
|---|---|---|
| 784,689 | Great Britain | Oct. 16, 1957 |